US010686525B2

(12) United States Patent
Jing et al.

(10) Patent No.: US 10,686,525 B2
(45) Date of Patent: Jun. 16, 2020

(54) CONTROL METHOD AND SYSTEM FOR CASCADE HYBRID AMPLIFIER

(71) Applicant: Accelink Technologies Co., Ltd., Wuhan (CN)

(72) Inventors: Yunyu Jing, Wuhan (CN); Chengpeng Fu, Wuhan (CN); Jintao Tao, Wuhan (CN); Cuihong Zhang, Wuhan (CN); Tao Xiong, Wuhan (CN); Zhi Yang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 343 days.

(21) Appl. No.: 15/754,912

(22) PCT Filed: Dec. 18, 2015

(86) PCT No.: PCT/CN2015/097825
§ 371 (c)(1),
(2) Date: Feb. 23, 2018

(87) PCT Pub. No.: WO2017/031876
PCT Pub. Date: Mar. 2, 2017

(65) Prior Publication Data
US 2018/0241473 A1 Aug. 23, 2018

(30) Foreign Application Priority Data
Aug. 25, 2015 (CN) .......................... 2015 1 0528840

(51) Int. Cl.
*H04B 10/294* (2013.01)
*H01S 3/23* (2006.01)
(Continued)

(52) U.S. Cl.
CPC ..... *H04B 10/2942* (2013.01); *H01S 3/06754* (2013.01); *H01S 3/1001* (2019.08);
(Continued)

(58) Field of Classification Search
CPC ............... H01S 3/13013; H01S 3/1001; H01S 3/06754; H01S 3/10015; H01S 3/2375;
(Continued)

(56) References Cited

U.S. PATENT DOCUMENTS

| 6,888,670 B2 | 5/2005 | Oh et al. |
| 2003/0137720 A1* | 7/2003 | Onaka .................. H01S 3/13013 |
| | | 359/334 |

(Continued)

FOREIGN PATENT DOCUMENTS

| CN | 1490941 A | 4/2004 |
| CN | 2631132 | 8/2004 |

(Continued)

OTHER PUBLICATIONS

Chinese Search Report for Application No. CN201510528840 dated Mar. 31, 2017.

(Continued)

*Primary Examiner* — Eric L Bolda
(74) *Attorney, Agent, or Firm* — Lerner, David, Littenberg, Krumholz & Mentlik, LLP

(57) ABSTRACT

Provided are a control method and system for a cascade hybrid amplifier, in which respective hybrid amplifiers in the cascade hybrid amplifier simultaneously start to implement a pump-starting process comprising: when the hybrid amplifier receives a request to start pumping, determining whether conditions are satisfied, if yes, determining stability of power of an input light of a Raman, starting pumping of an EDFA so that the EDFA enters into an APC operation mode; starting pumping of the Raman, and calculating a gain deviation according to the calculated input light powers before and after pump-starting of the Raman when no reflection alarm exists; and adjusting gain of the Raman according to the gain deviation, and switching to an AGC (Continued)

(automatic gain control) operation mode after the adjustment; and switching the EDFA to the AGC operation mode.

2 Claims, 3 Drawing Sheets

(51) Int. Cl.
*H01S 3/10* (2006.01)
*H01S 3/13* (2006.01)
*H04B 10/293* (2013.01)
*H01S 3/067* (2006.01)
*H04B 10/071* (2013.01)
*H01S 3/16* (2006.01)
*H01S 3/30* (2006.01)
*H01S 3/00* (2006.01)

(52) U.S. Cl.
CPC ...... *H01S 3/10015* (2013.01); *H01S 3/13013* (2019.08); *H01S 3/2375* (2013.01); *H04B 10/293* (2013.01); *H04B 10/2935* (2013.01); *H01S 3/0014* (2013.01); *H01S 3/06758* (2013.01); *H01S 3/10069* (2013.01); *H01S 3/1608* (2013.01); *H01S 3/302* (2013.01); *H01S 2301/04* (2013.01); *H04B 10/071* (2013.01)

(58) Field of Classification Search
CPC ............. H04B 10/2942; H04B 10/292; H04B 10/2935
See application file for complete search history.

(56) References Cited

U.S. PATENT DOCUMENTS

| 2004/0201882 | A1* | 10/2004 | Kikuchi | H04B 10/2916 359/341.43 |
| 2011/0255151 | A1 | 10/2011 | Magri et al. | |
| 2012/0327505 | A1* | 12/2012 | Fu | H04B 10/2931 359/334 |
| 2014/0146385 | A1* | 5/2014 | Takeyama | H04B 10/2916 359/334 |
| 2015/0002922 | A1* | 1/2015 | Kim | H01S 3/302 359/334 |

FOREIGN PATENT DOCUMENTS

CN 102843192 A 12/2012
CN 103904550 A 7/2014

OTHER PUBLICATIONS

International Search Report for Application No. PCT/CN2015/097825 dated May 13, 2016.

* cited by examiner

CONTROL METHOD AND SYSTEM FOR CASCADE HYBRID AMPLIFIER

CROSS-REFERENCE TO RELATED APPLICATION

This application is a national phase entry under 35 U.S.C. § 371 of International Application No. PCT/CN2015/097825, filed Dec. 18, 2015, which claims priority to Chinese Patent Application No. 201510528840.X, filed on Aug. 25, 2015, the disclosures of which are incorporated herein by reference.

TECHNICAL FIELD OF THE DISCLOSURE

The present disclosure belongs to the field of power distribution operation, and particularly, to a control method and system for a cascade hybrid amplifier.

BACKGROUND

Currently, methods for Raman gain control in a hybrid amplifier are mostly control methods based on feed-forward plus feedback. Such control methods have been proved to be effective in practical engineering applications, but they are not perfect in accuracy of Raman gain control. Therefore, some techniques have been proposed to improve accuracy of Raman gain control by using gain calibration methods, which may improve the accuracy of Raman gain control for a single hybrid amplifier in the laboratory. However, when plural hybrid amplifiers are connected in cascade in practical engineering applications, the gain calibration methods may fail. Referring to FIG. 1, three hybrid amplifiers, which are labeled as Hybrid 1, Hybrid 2, and Hybrid 3 respectively, are connected in cascade, each including a Raman fiber amplifier (RFA) and an Erbium-Doped Fiber Amplifier (EDFA). The gain calibration methods assume the input light for a hybrid amplifier remains constant, and the gain calibration is realized based on change of the input light. When the hybrid amplifiers are connected in cascade, the Raman fiber amplifier and the EDFA are controlled synchronously with control timing shown in FIG. 2, which illustrates a timing diagram for pump-starting of the first and second hybrid amplifiers in the cascade. For the first hybrid amplifier, control of the hybrid amplifier includes determining whether the input light is stable according to change of slope of the input light power. If it is determined that the input light power is stable, the Raman and the EDFA may start pumping simultaneously. Then, the Raman enters into an automatic gain calibration procedure A, after which the Raman may switch to a target mode, i.e. an AGC (automatic gain control) mode. For the EDFA, it may enter into the AGC mode quickly after it starts pumping. However, due to change of the output light power of the Raman after the automatic gain calibration is completed, the EDFA generates also a change in its output light power. The output of the EDFA is the output of the first hybrid amplifier. Thus, a problem arises when a plurality of amplifiers are used in cascade. Specifically, the output light power of a hybrid amplifier is used for gain calibration of a next hybrid amplifier, while a precondition for correct gain calibration is that the input light entering into the Raman must remain stable. In FIG. 2, the input light of the first hybrid amplifier start changing from scratch at a timing 1, and the changing is relatively slow. At the timing 1, the hybrid amplifier checks whether the input light becomes stable. When it is determined that the input light has been stable at a timing 2, the Raman and the EDFA in the first hybrid amplifier start pumping simultaneously. For the second hybrid amplifier, as the output light of the EDFA in the first hybrid amplifier is unstable from the pump-starting timing 2 to a timing 3, the Raman in the second hybrid amplifier determines whether the input light is stable during the timing 2 to the timing 3, and then implements the gain calibration during the timing 3 to a timing 4. As the output light of the EDFA in the first hybrid amplifier changes when the Raman in the second hybrid amplifier is implementing the automatic gain calibration B (from the timing 3 to the timing 4), the automatic gain calibration of the Raman in the second hybrid amplifier cannot result in a correct calibration, causing an obvious deviation in control accuracy of the Raman. Also, it may be seen from FIG. 2 that due to the cascade of the plurality of hybrid amplifiers, a further problem may arise that a next hybrid amplifier starts pumping later than a last hybrid amplifier does.

SUMMARY

An object of the present disclosure is to overcome shortcomings in the prior arts by controlling timing of the Raman and the EDFA in a hybrid amplifier cooperatively during the Raman is implementing the gain calibration so as to enable a high control accuracy even in applications including a plurality of hybrid amplifiers connected in cascade.

A technical solution of the present disclosure provides a method for controlling a cascade hybrid amplifier including a plurality of hybrid amplifiers (Hybrids) connected in cascade, each hybrid amplifier including a Raman fiber amplifier (Raman) and an erbium-doped fiber amplifier (EDFA), each hybrid amplifier in the cascade hybrid amplifier simultaneously starting to implement a pump-starting process comprising:

Step 1, proceeding to Step 2 when the hybrid amplifier receives a request to start pumping;

Step 2, determining whether power of the input optical signal is greater than a LOS (lost-of-signal) threshold set for the hybrid amplifier and whether a Raman reflection alarm exists, until the power of the input optical signal is greater than the LOS threshold and no Raman reflection alarm exists, and then proceeding to Step 3;

Step 3, determining stability of power of the input light for the Raman, including determining whether the power of the input light is stable according to change of slope of the power of the input light, and proceeding to Step 4 if the power of the input light is determined to be stable when the change of the power of the input light is less than a predetermined comparison value, or stopping pumping of the Raman and returning to Step 2 to continue the determination; and meanwhile, starting pumping of the EDFA so that the EDFA enters into an APC (automatic power control) operation mode;

Step 4, recording and saving the power of the input light of the Raman before pump-starting as a value PINU1;

Step 5, starting pumping of the Raman;

Step 6, determining whether a Raman reflection alarm exists after the Raman starts pumping, and proceeding to Step 7 if not, or stopping pumping of the Raman if yes, and returning to Step 2 to continue the determination when it is detected that the Raman reflection alarm goes off after the Raman stops pumping;

Step 7, calculating and recording the power of the input light of the Raman after pump-starting as a value PINU2, and calculating a gain deviation Goffset=PINU1−PINU2 based on the values PINU1 and PINU2;

Step 8, adjusting gain of the Raman according to Goffset obtained in Step 7, and switching to an AGC (automatic gain control) operation mode after the Raman gain calibration is completed; and Step 9, switching the EDFA to the AGC operation mode, and finishing the pump-starting process.

The present disclosure further provides a control system for a cascade hybrid amplifier including a plurality of hybrid amplifiers connected in cascade, each hybrid amplifier including a Raman fiber amplifier (Raman) and an erbium-doped optical fiber amplifier (EDFA), comprising:

a request response module configured to issue an operation command when the hybrid amplifier receives a request to start pumping;

an initial determination module configured to determine whether power of the input optical signal is greater than a LOS (lost-of-signal) threshold set for the hybrid amplifier and whether a Raman reflection alarm exists, until the power of the input optical signal is greater than the LOS threshold and no Raman reflection alarm exists, and then command an input light determination module to operate;

the input light determination module configured to determine stability of power of the input light for the Raman, including determining whether the power of the input light is stable according to change of slope of the power of the input light, and to command an initial input light power recording module to operate if the power of the input light is determined to be stable when the change of the power of the input light is less than a predetermined comparison value, or stop pumping of the Raman and command the initial determination module to continue the determination; and meanwhile, start pumping of the EDFA so that the EDFA enters into an APC (automatic power control) operation mode;

the initial input light power recording module configured to record and save the power of the input light of the Raman before pump-starting as a value PINU1;

a Raman pump-starting module configured to start pumping of the Raman;

a reflection alarm determination module configured to determine whether the Raman reflection alarm exists after the Raman starts pumping, and to command a gain deviation acquisition module to operate if no, or stop pumping of the Raman if yes, and command the initial determination module to determine again when it is detected that the Raman reflection alarm goes off after the Raman stops pumping;

the gain deviation acquisition module configured to calculate and record the power of the input light after the Raman starts pumping as a value PINU2, and to calculate a gain deviation Goffset=PINU1−PINU2 based on the values PINU1 and PINU2;

a gain calibration module configured to adjust gain of the Raman according to the Goffset obtained by the gain deviation acquisition module, and to switch the Raman to an AGC (automatic gain control) operation mode after the gain calibration is completed; and an EDFA switching module configured to switch the EDFA to the AGC operation mode, the pump-starting process being finished.

The present disclosure can control the gain of the Raman accurately when the cascade hybrid amplifier is used, thereby improving control accuracy and performance of the cascade hybrid amplifier.

DETAILED DESCRIPTION

Figure 1:
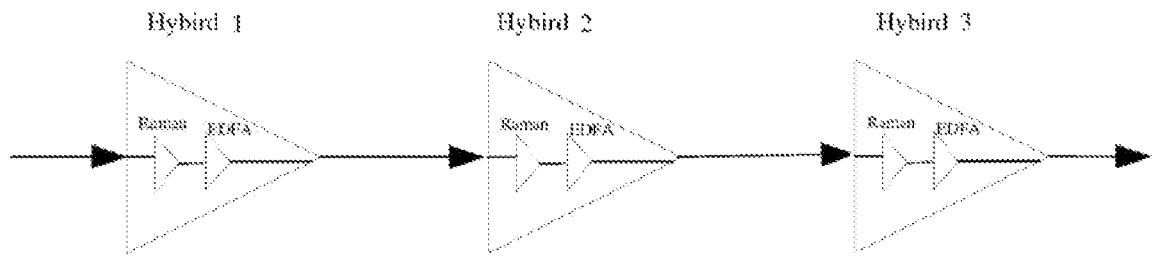
FIG. 1 is a schematic diagram showing a hybrid amplifier cascade in the prior art.
Figure 2:
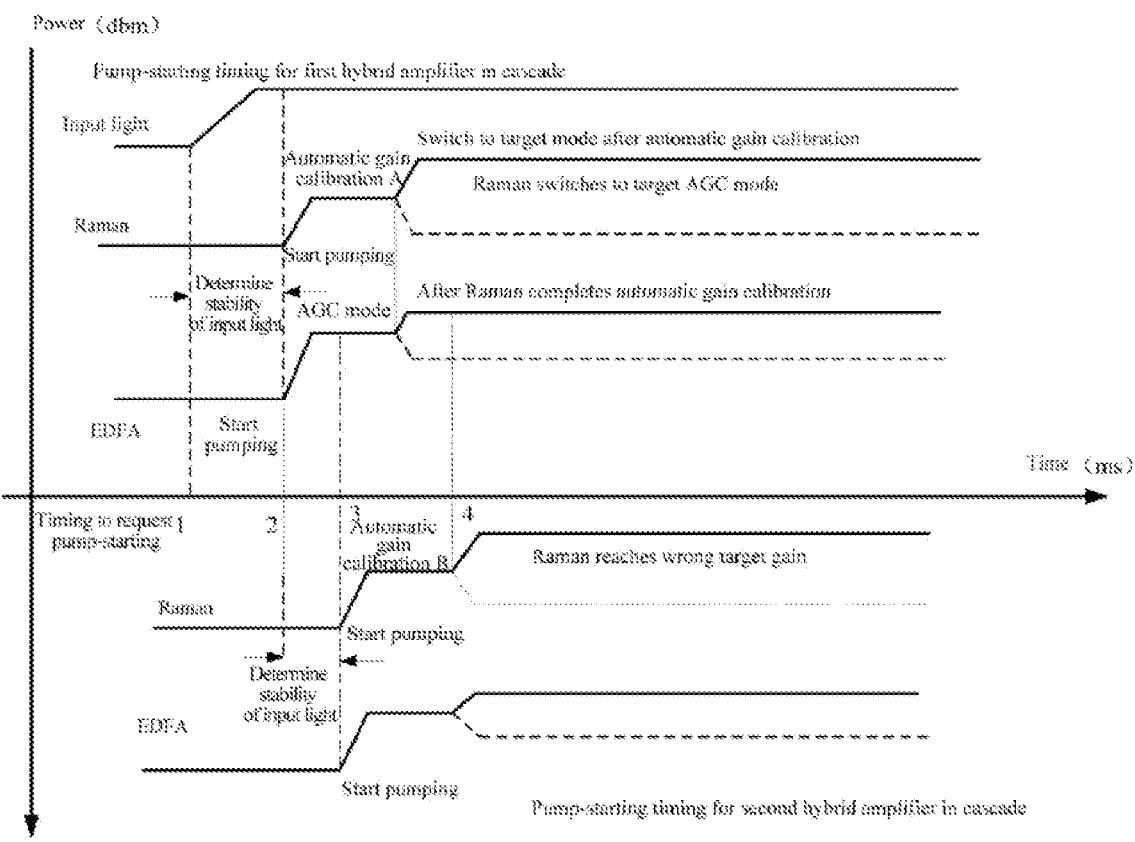
FIG. 2 is a timing diagram showing control timing of a hybrid amplifier cascade in the prior art.

In order to make the purposes, technical solutions, and advantages of embodiments of the present disclosure more apparent, the technical solutions of the present disclosure are discussed below with reference to the embodiments of the present disclosure and the drawings.

The present disclosure mainly aims to, when hybrid amplifiers are connected in cascade, realize automatic gain calibration for a Raman amplifier in a process of starting pumping of the hybrid amplifier by controlling the Raman and EDFA amplifiers in the hybrid amplifier cooperatively during the process of starting pumping. In an existing hybrid amplifier, a unit is provided to control the Raman and the EDFA. Generally, a MCU (microcontroller unit) and a FPGA (field programmable gate array) cooperate to implement the control. The goal of the control is to make the Raman amplifier eventually operate in an AGC (automatic gain control) mode and the EDFA amplifier also operate in the AGC mode. In embodiments, those skilled in the art may implement the method of the present disclosure by software based on the control unit so as to realize automatic operation of the process.

An embodiment may be implemented by respective hybrid amplifiers in cascade simultaneously starting to carry out the following process:

1. Proceeding to Step 2 when the hybrid amplifier receives a request to start pumping. In practical engineering applications, a plurality of hybrid amplifiers may receive the request to start pumping at the same time.

2. Determining whether power of the input optical signal is greater than a LOS (lost-of-signal) threshold set for the hybrid amplifier and whether a Raman reflection alarm exists simultaneously, until the power of the input optical signal is greater than the LOS threshold and no Raman reflection alarm exists, and then proceeding to Step 3.

3. Determination of stability of the Raman input light power: determining whether the power of the input light for the Raman is stable according to change of slope of the input light power, and proceeding to Step 4 if the input light power is determined to be stable when the change of the input light power is less than a comparison value (which may be predetermined by those skilled in the arts for practical applications), or stopping pumping of the Raman and returning to Step 2 to continue the determination; and at the same time, implementing Step 3' of starting pumping of the EDFA and then proceeding to Step 4' of entering into an APC (automatic power control) operation mode in which the EDFA outputs a desirable fixed power and maintain the power until Step 8 is completed.

4. Recording and latching the power of the input light of the Raman before pump-starting as a value PINU1 (input light power 1). In practical implementations, the value PINU1 may be obtained by direct detection when the Raman has not yet started to pump.

5. Starting pumping of the Raman.

6. Determining whether a Raman reflection alarm exists after the Raman starts pumping, and proceeding to Step 7 if not, or stopping pumping of the Raman if yes, and returning to Step 2 to continue the determination when it is detected that the Raman reflection alarm goes off after the Raman stops pumping.

7. Calculating and recording the power of the input light of the Raman after pump-starting as a value PINU2 (input light power 2), and calculating a gain deviation Goffset=PINU1−PINU2 based on the values PINU1 and PINU2. In practical implementations, as the input light power of the Raman may be amplified after pump-starting, an original input light power of the Raman amplifier may be calculated as the value PINU2. Calculation of the input light power of the Raman after pump-starting is well known in the art, which may be carried out by a MCU (microcontroller unit) and details thereof will be omitted here.

8. Adjusting gain of the Raman according to the Goffset, and completing the Raman gain calibration. After that, the Raman may be switched to an AGC (automatic gain control) operation mode.

9. After Step 8 is finished, control of the EDFA proceeding from Step 4' to Step 5' of switching the EDFA to a target (AGC) operation mode when the Raman gain calibration has been completed. Thus, the process of Raman gain calibration has been completed, and the pump-starting process ends. In practical implementations of engineering applications, a time margin may be pre-set to switch the EDFA to the target AGC operation mode at a predetermined timing so that the time period when the EDFA is in the APC mode can entirely cover the time period when the Raman is carrying out the gain calibration.

Figure 3:
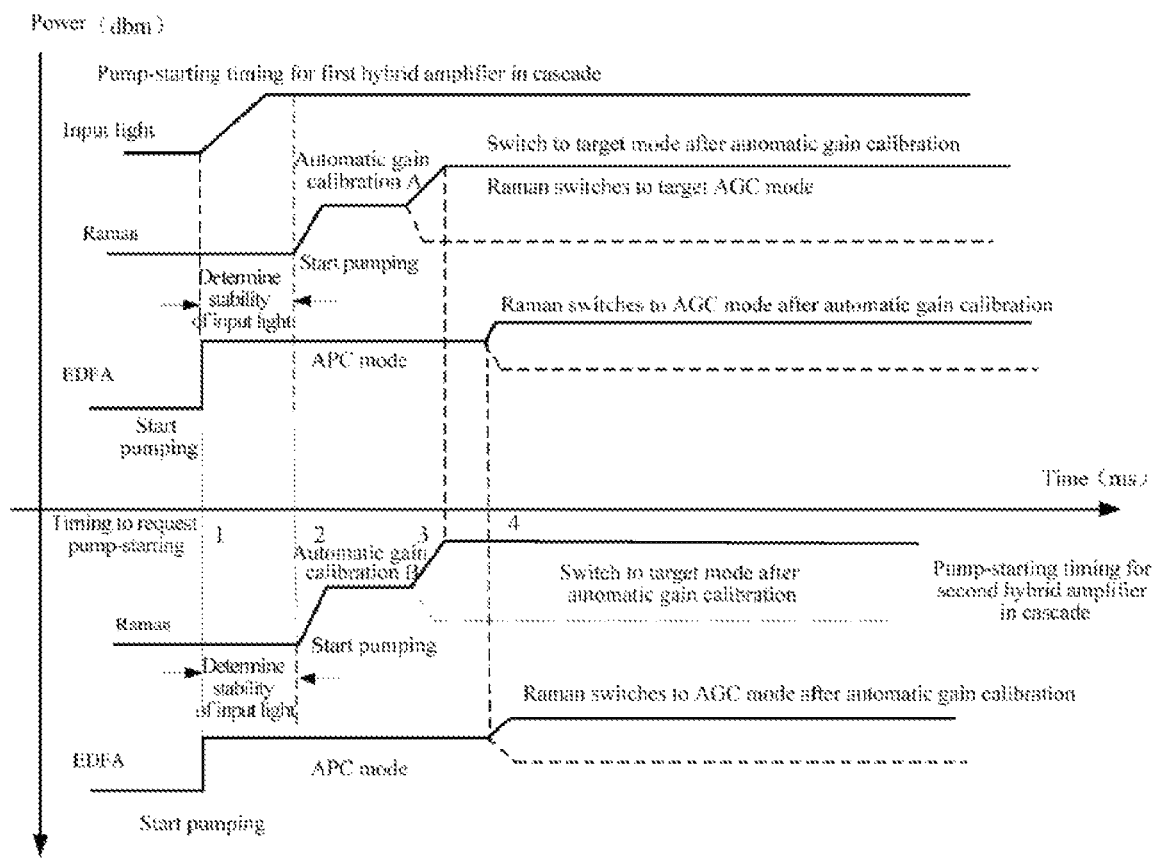
FIG. 3 is a timing diagram showing control timing of a cascade hybrid amplifier in accordance with the present disclosure.
Figure 4:
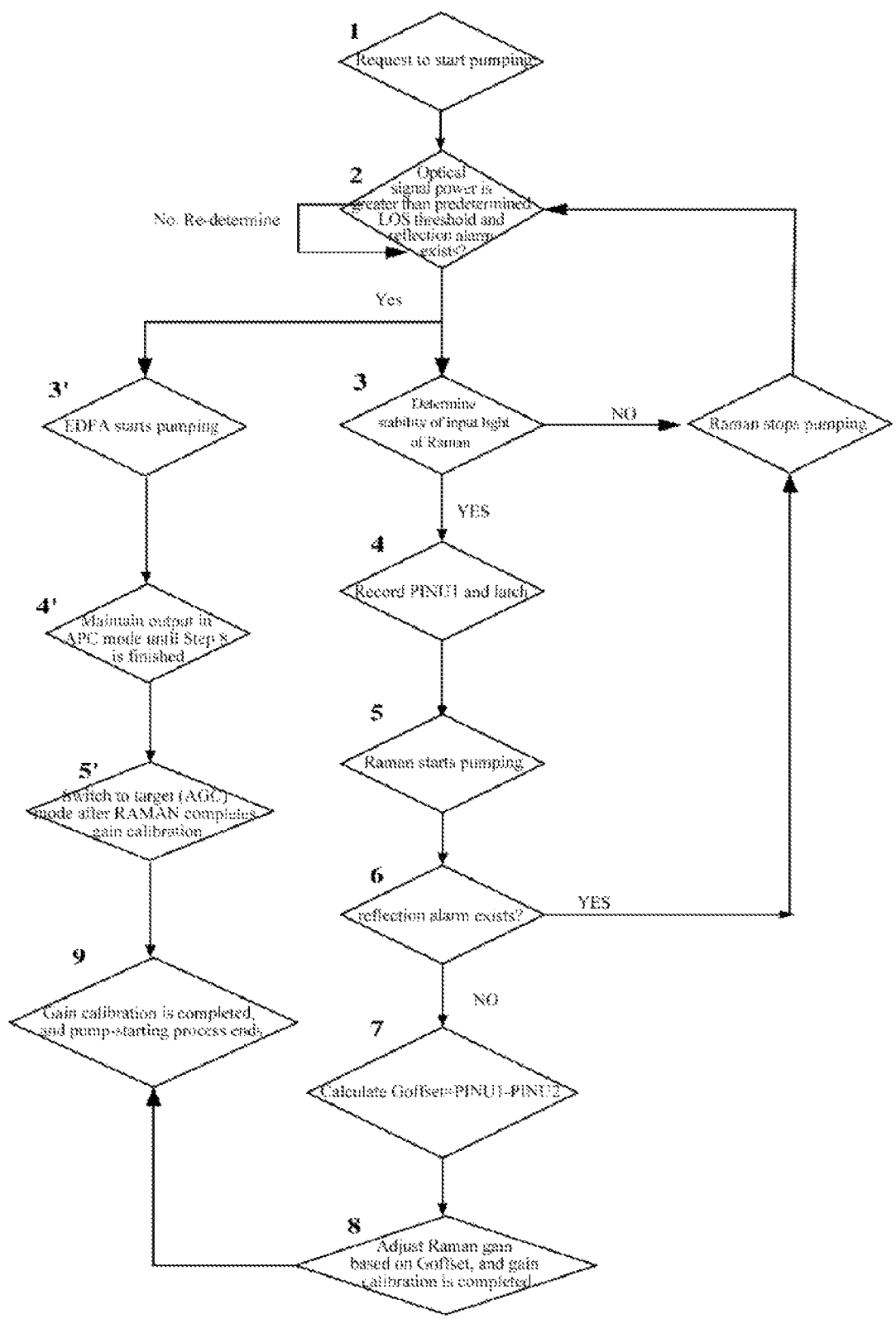
FIG. 4 is a flow diagram in accordance with an embodiment of the present disclosure.

FIG. 3 is a timing diagram showing control timing of a cascade hybrid amplifier in accordance with the present disclosure. As shown, at a timing 1 when a plurality of hybrid amplifiers in cascade (two in the figure as an example) are powered on simultaneously, the EDFA enters into a pump-starting state and operates in an APC (automatic power control) mode in which its optical output has desirable power. At the timing 1, meanwhile, the Raman begins to determine stability of its input light. At a timing 2, the Raman determines that the power of the input light is stable, starts pumping, and proceeds to an automatic gain calibration process. The Raman automatic gain calibration processes of the first and second hybrid amplifiers are referred to as the automatic gain calibration A and B, respectively. At a timing 3, the Raman automatic gain calibration is completed. At that time, as the EDFA operates in the APC (automatic power control) mode, the output of the EDFA would not be affected by the Raman automatic gain calibration. At a timing 4, the EDFA switches from the APC mode to the AGC mode. Due to the cascade arrangement, the control process for the second hybrid amplifier is completely the same with that of the first hybrid amplifier, except that the input light of the second hybrid amplifier is the output light of the first hybrid amplifier (i.e., the output light of the EDFA). It can be seen from the figure that during the process of the automatic gain calibration B for the Raman in the second hybrid amplifier (from the timing 2 to the timing 3), the EDFA in the first hybrid amplifier always keeps in the APC mode, which ensures the stability of the input light of the Raman in the second hybrid amplifier while it is performing the gain calibration. Therefore, the Raman can complete the automatic gain calibration correctly and eventually switch to the target (AGC) mode, and the accuracy of gain control can be ensured. Since the EDFA in the first hybrid amplifier starts pumping and enters into the APC mode at the timing of power-on, the stability of the input light of the Raman in the second hybrid amplifier may be ensured during the automatic gain calibration process. Thus, in a case where a plurality of hybrid amplifiers are arranged in cascade, each hybrid amplifier can perform the Raman automatic gain calibration correctly, and the control accuracy for each hybrid amplifier may be ensured.

In practical implementations, a corresponding system may be implemented in a modular manner. The present disclosure also provides a control system for a cascade hybrid amplifier comprising the following modules:

a request response module to issue an operation command when the hybrid amplifier receives a request to start pumping;

an initial determination module to determine whether power of the input optical signal is greater than a LOS (lost-of-signal) threshold set for the hybrid amplifier and whether a Raman reflection alarm exists, until the power of the input optical signal is greater than the LOS threshold and no Raman reflection alarm exists, and then command an input light determination module to operate;

the input light determination module to determine stability of power of the input light for the Raman, including determining whether the power of the input light is stable according to change of slope of the power of the input light, and to command an initial input light power recording module to operate if the power of the input light is determined to be stable when the change of the power of the input light is less than a predetermined comparison value, or stop pumping of the Raman and command the initial determination module to continue the determination; and meanwhile, start pumping of the EDFA so that the EDFA enters into an APC (automatic power control) operation mode in which the EDFA outputs a fixed power;

the initial input light power recording module to record and save the power of the input light of the Raman before pump-starting as a value PINU1;

a Raman pump-starting module to start pumping of the Raman;

a reflection alarm determination module to determine whether the Raman reflection alarm exists after the Raman starts pumping, and to command a gain deviation acquisition module to operate if no, or stop pumping of the Raman if yes, and command the initial determination module to determine again when it is detected that the Raman reflection alarm goes off after the Raman stops pumping;

the gain deviation acquisition module to calculate and record the power of the input light after the Raman starts pumping as a value PINU2, and to calculate a gain deviation Goffset=PINU1−PINU2 based on the values PINU1 and PINU2;

a gain calibration module to adjust gain of the Raman according to the Goffset obtained by the gain deviation acquisition module, and to switch the Raman to an AGC (automatic gain control) operation mode after the gain calibration is completed; and an EDFA switching module to switch the EDFA to the AGC operation mode, the pump-starting process being finished.

It is to be appreciated that the embodiments of the present disclosure are intended to be illustrative but not restrictive. Therefore, the present disclosure is not limited to the embodiments described in the detailed description, and other embodiments that are devised by those skilled in the art according to the technical solutions of the present disclosure also fall within the scope of the present disclosure.

What is claimed is:

1. A method for controlling a cascade hybrid amplifier including a plurality of hybrid amplifiers connected in cascade, each hybrid amplifier including a Raman fiber amplifier (Raman) and an erbium-doped fiber amplifier (EDFA), characterized in each hybrid amplifier in the cascade hybrid amplifier simultaneously starting to implement a pump-starting process comprising:

Step 1, proceeding to Step 2 when the hybrid amplifier receives a request to start pumping;

Step 2, determining whether power of an input optical signal is greater than a LOS (lost-of-signal) threshold set for the hybrid amplifier and whether a Raman reflection alarm exists, until the power of the input optical signal is greater than the LOS threshold and no Raman reflection alarm exists, and then proceeding to Step 3;

Step 3, determining stability of the power of the input light for the Raman, including determining whether the power of the input light is stable according to change of slope of the power of the input light, and proceeding to Step 4 if the power of the input light is determined to be stable when the change of the power of the input light is less than a predetermined comparison value, or stopping pumping of the Raman and returning to Step 2 to continue the determination; and meanwhile, starting pumping of the EDFA so that the EDFA enters into an APC (automatic power control) operation mode;

Step 4, recording and saving the power of the input light of the Raman before pump-starting as a value PINU1;

Step 5, starting pumping of the Raman;

Step 6, determining whether the Raman reflection alarm exists after the Raman starts pumping, and proceeding to Step 7 if not, or stopping pumping of the Raman if yes, and returning to Step 2 to continue the determination when it is detected that the Raman reflection alarm goes off after the Raman stops pumping;

Step 7, calculating and recording the power of the input light of the Raman after pump-starting as a value PINU2, and calculating a gain deviation Goffset=PINU1−PINU2 based on the values PINU1 and PINU2;

Step 8, adjusting gain of the Raman according to Goffset obtained in Step 7, and switching to an AGC (automatic gain control) operation mode after the Raman gain calibration is completed; and Step 9, switching the EDFA to the AGC operation mode, and finishing the pump-starting process.

2. A control system for a cascade hybrid amplifier including a plurality of hybrid amplifiers connected in cascade, each hybrid amplifier including a Raman fiber amplifier (Raman) and an erbium-doped fiber amplifier (EDFA), characterized in comprising the following modules:

a request response module configured to issue an operation command when the hybrid amplifier receives a request to start pumping;

an initial determination module configured to determine whether power of the input optical signal is greater than a LOS (lost-of-signal) threshold set for the hybrid amplifier and whether a Raman reflection alarm exists, until the power of the input optical signal is greater than the LOS threshold and no Raman reflection alarm exists, and then command an input light determination module to operate;

the input light determination module configured to determine stability of power of the input light for the Raman, including determining whether the power of the input light is stable according to change of slope of the power of the input light, and to command an initial input light power recording module to operate if the power of the input light is determined to be stable when the change of the power of the input light is less than a predetermined comparison value, or stop pumping of the Raman and command the initial determination module to continue the determination; and meanwhile, start pumping of the EDFA so that the EDFA enters into an APC (automatic power control) operation mode;

the initial input light power recording module configured to record and save the power of the input light of the Raman before pump-starting as a value PINU1;

a Raman pump-starting module configured to start pumping of the Raman;

a reflection alarm determination module configured to determine whether the Raman reflection alarm exists after the Raman starts pumping, and to command a gain deviation acquisition module to operate if no, or stop pumping of the Raman if yes, and command the initial determination module to determine again when it is detected that the Raman reflection alarm goes off after the Raman stops pumping;

the gain deviation acquisition module configured to calculate and record the power of the input light after the Raman starts pumping as a value PINU2, and to calculate a gain deviation Goffset=PINU1−PINU2 based on the values PINU1 and PINU2;

a gain calibration module configured to adjust gain of the Raman according to the Goffset obtained by the gain deviation acquisition module, and to switch the Raman to an AGC (automatic gain control) operation mode after the gain calibration is completed; and an EDFA switching module configured to switch the EDFA to the AGC operation mode, the pump-starting process being finished.

* * * * *